(12) United States Patent
Routray et al.

(10) Patent No.: US 11,562,371 B2
(45) Date of Patent: Jan. 24, 2023

(54) COUNTERFEIT PHARMACEUTICAL AND BIOLOGIC PRODUCT DETECTION USING PROGRESSIVE DATA ANALYSIS AND MACHINE LEARNING

(71) Applicant: International Business Machines Corporation, Armonk, NY (US)

(72) Inventors: Ramani R. Routray, San Jose, CA (US); Ashwin Dhinesh Kumar, Ossining, NY (US); Venkat K. Balagurusamy, Suffern, NY (US); Donna N Eng Dillenberger, Yorktown Heights, NY (US); Bruce Light Hillsberg, San Carlos, CA (US); Mark Dudman, Seabrook Beach, NH (US)

(73) Assignee: MERATIVE US L.P., Ann Arbor, MI (US)

( * ) Notice: Subject to any disclaimer, the term of this patent is extended or adjusted under 35 U.S.C. 154(b) by 359 days.

(21) Appl. No.: 16/849,382

(22) Filed: Apr. 15, 2020

(65) Prior Publication Data
US 2021/0326899 A1   Oct. 21, 2021

(51) Int. Cl.
*G06K 5/00* (2006.01)
*G06Q 30/00* (2012.01)
(Continued)

(52) U.S. Cl.
CPC .......... *G06Q 30/0185* (2013.01); *G06N 3/04* (2013.01); *G06N 20/00* (2019.01); *G06V 20/20* (2022.01)

(58) Field of Classification Search
CPC ........ G06N 20/00; G06N 3/04; G06N 3/0454; G06N 3/08; G06V 20/20; G06V 10/145;
(Continued)

(56) References Cited

U.S. PATENT DOCUMENTS 7,647,285 B2   1/2010   Heckerman et al.
7,850,081 B2   12/2010  Swan et al.
(Continued)

FOREIGN PATENT DOCUMENTS

WO   2018178822 A1   10/2018
WO   2018227160 A1   12/2018

OTHER PUBLICATIONS

F. Tahir, "Formulating Offline Nondestructive Validation of Solid Drug Surface Morphology Using Microscopic Multispectral High Resolution Imaging", A Thesis Submitted to Lahore College for Women University in Partial Fulfilment of the Requirements for the Degree of Doctor of Philosophy in Computer Science, 03-B/LCWU-5703, Lahore-Pakistan, 2015, 178 pages.
(Continued)

*Primary Examiner* — Daniel St Cyr
(74) *Attorney, Agent, or Firm* — Edell, Shapiro & Finnan, LLC

(57) ABSTRACT

Techniques are provided for detecting counterfeit products. Measurements and images corresponding to a product are obtained, wherein at least a portion of the measurements or images are obtained from a mobile/IoT/IoB device. The measurements and images are provided to a trained machine learning model to progressively analyze the measurements and images. Based on the progressive analysis, a determination/prediction is made with an associated confidence score as to whether the product is real or counterfeit.

20 Claims, 9 Drawing Sheets

(51) Int. Cl.
*G06N 20/00* (2019.01)
*G06N 3/04* (2006.01)
*G06V 20/20* (2022.01)

(58) Field of Classification Search
CPC .............. G06V 20/95; G06Q 30/0185; G06Q 10/087; G06K 9/6231; G06K 9/6237; G06K 19/06009; G06K 19/02028
USPC .......................... 705/318; 235/380, 383, 385
See application file for complete search history.

(56) References Cited

U.S. PATENT DOCUMENTS

| | | | |
|---|---|---|---|
| 2005/0077476 | A1 | 4/2005 | Poteet et al. |
| 2007/0112598 | A1 | 5/2007 | Heckerman et al. |
| 2007/0119929 | A1 | 5/2007 | Swan et al. |
| 2008/0154625 | A1* | 6/2008 | Serbanescu ........ G06Q 30/0603 705/26.1 |
| 2010/0305499 | A1 | 12/2010 | Matsiev et al. |
| 2014/0154813 | A1 | 6/2014 | Decoux et al. |
| 2015/0269593 | A1 | 9/2015 | Le |
| 2017/0032285 | A1 | 2/2017 | Sharma et al. |
| 2017/0068084 | A1 | 3/2017 | Schweitzer |
| 2017/0234819 | A1 | 8/2017 | Lilik et al. |
| 2019/0236614 | A1 | 8/2019 | Burgin et al. |
| 2019/0272908 | A1* | 9/2019 | Hill ...................... G06V 30/153 |
| 2020/0342259 | A1* | 10/2020 | Jordan ...................... G06T 7/70 |
| 2021/0142337 | A1* | 5/2021 | Guinard ............. G06Q 30/0185 |

OTHER PUBLICATIONS

Mishra et al., "Speky: A diffraction based application specific instrumentation (ASIN) counterfeit medicine detection system", 2017 International Conference on Computer, Communication and Signal Processing (ICCCSP). IEEE, 2017, 5 pages.

Bate et al., "Pilot study comparing technologies to test for substandard drugs in field settings", African Journal of Pharmacy and Pharmacology 3.4 (2009): 165-170, 6 pages.

Rodionova, et al., "NIR spectrometry for counterfeit drug detection: A feasibility study", Analytica Chimica Acta 549.1-2 (2005): 151-158, 8 pages.

QingYing, E&T LLC, "Fingertip Microscope", https://www.kickstarter.com/projects/1289187249/fingertip-microscope-bring-a-800x-microscope-on-yo, downloaded from the internet on Mar. 30, 2020, 27 pages.

IPhone App, "Hydra > Amazing Photography", https://itunes.apple.com/GB/app/id947824428?mt=8, downloaded from the internet on Mar. 30, 2020, 3 pages.

D. Dillenberger, "Pairing AI with Optical Scanning for Real-World Product Authentication", May 23, 2018, https://www.ibm.com/blogs/research/2018/05/ai-authentication-verifier/, 8 pages.

A.K. Mishra, et al., "Low-cost spectrogram based counterfeit medicine and contaminated food detection", https://arxiv.org/abs/1904.07152, Apr. 10, 2019, 7 pages.

B. McKenzie et al., "Chronoprints: Identifying Samples by Visualizing How They Change over Space and Time" Research Article, ACS Cent. Sci. May 2019, 589-598, 10 pages.

W. Herrington et al., "Optical Detection of Degraded Therapeutic Proteins", Sci Rep 8, 5089 (2018), https://doi.org/10.1038/s41598-018-23409-z, Mar. 23, 2018, 10 pages.

P. He et al., "Honey Authentication with Machine Learning Augmented Bright-Field Microscopy", Submitted on Dec. 28, 2018, https://arxiv.org/abs/1901.00516v1, 32nd Conference on Neural Information Processing Systems (NIPS 2018), Montréal, Canada, 6 pages.

Balagurusamy, et al., "Crypto anchors", IBM Journal of Research and Development, (vol. 63, Issue 2/3, Mar./May 2019), https://ieeexplore.ieee.org/abstract/document/8645638/, Feb. 20, 2019, 12 pages.

Gowen et al., "Hyperspectral imaging—an emerging process analytical tool for food quality and safety control", Trends in Food Science & Technology, vol. 18, Issue 12, Dec. 2007, 10 pages.

* cited by examiner

PHYSICAL/CHEMICAL/OPTICAL MEASUREMENT VIA MANUAL/IoT/IoB/DEVICE MEASUREMENT

| COLOR<br>HUE<br>SATURATION<br>VALUE<br>TEXTURE<br>IMPRINT ON PILL<br>REFLECTION<br>FLUORESCENCE<br>ABSORPTION | BARCODE<br>EMBLEM<br>LOT NUMBER<br>MANUFACTURER LOGO<br>SHAPE OF PACKAGE<br>HOLOGRAM | VISCOSITY<br>pH<br>MOLECULAR COMPONENTS<br>COMBINATORIAL CHEMICALS<br>ADHESION<br>COHESION SPECTRUM<br>COLORIMETRIC ASSAY<br>CHEMICAL SENSORS |
|---|---|---|
| 210 ⟋<br>INTERNAL<br>NON-INTRUSIVE | 220 ⟋<br>EXTERNAL<br>NON-INTRUSIVE | 230 ⟋<br>INTERNAL<br>INTRUSIVE |

FIG.2A

DATA PREPERATION BITMAP
205

| HUE | BARCODE | LOT NUMBER | VISCOSITY |
|---|---|---|---|
| 0 | 0 | 0 | 1 |
| 0 | 0 | 1 | 0 |
| 0 | 0 | 0 | 1 |
| 0 | 1 | 0 | 0 |
| 0 | 1 | 1 | 1 |
| 0 | 1 | 0 | 0 |
| 0 | 0 | 1 | 1 |
| 1 | 0 | 1 | 0 |
| 1 | 0 | 0 | 1 |
| 1 | 0 | 1 | 0 |
| 1 | 1 | 0 | 1 |
| 1 | 1 | 0 | 0 |
| 1 | 1 | 1 | 1 |

210 — INTERNAL NON-INTRUSIVE
220 — EXTERNAL NON-INTRUSIVE
220 — EXTERNAL NON-INTRUSIVE
230 — INTERNAL INTRUSIVE

COUNTERFEIT PHARMACEUTICAL AND BIOLOGIC PRODUCT DETECTION USING PROGRESSIVE DATA ANALYSIS AND MACHINE LEARNING

TECHNICAL FIELD

Present invention embodiments relate to detecting counterfeit pharmaceuticals and biologics, and in particular, to detecting counterfeit products based on their physical, chemical and/or optical properties using progressive data analysis and machine learning.

DISCUSSION OF THE RELATED ART

Counterfeit products are fake or unauthorized replicas of a real product. Such products are illegal and often harmful to health. For instance, counterfeit therapeutics may be contaminated with toxins, bacteria, or other microbes. In other cases, counterfeit therapeutics may contain the wrong ingredient or may not have a sufficient amount of an active ingredient. For instance, the counterfeit medicine may contain the active ingredient at an incorrect dose, or may not have any active ingredient at all. Counterfeit products are often substandard products sold beneath market value through sources that are not regulated.

Specifically, in high-end chemotherapy, counterfeit drugs are often replaced with inactive saline liquid or contain real therapeutic diluted with an inactive ingredient such as saline. Such products may be contained in packaging or vials from the real manufacturer and therefore, may be difficult to detect. In other aspects, the counterfeit therapeutic may be contained in falsified packaging.

The scale of counterfeit therapeutics is difficult to quantify precisely, however, a World Health Organization analysis pooled from various sources over a time period ranging from 2007 to 2016 and covering more than 48,000 samples, concluded that about 10.5% of therapeutics offered for sale are fake or substandard products. With pharmaceutical sales in such countries estimated at nearly $300 billion a year, trade in fake medicines is thought to be at least a $30 billion/year business.

SUMMARY

According to embodiments of the present invention, methods, systems, and computer readable media are provided for detecting counterfeit products. Measurements and images corresponding to a product are obtained, wherein at least a portion of the measurements or images are obtained from a mobile device. The measurements and images are provided to a trained machine learning model to progressively analyze data from the measurements and images, which may be provided in a form of a bitmap that encapsulates the data into multiple logical groups such as internal-intrusive, internal-nonintrusive, optical-intrusive, optical-nonintrusive, etc. Based on the progressive analysis, a detection/prediction is made with an associated confidence score as to whether the product is a real or counterfeit product.

In aspects, the measurements and images capture physical, spectral, optical, and/or chemical properties of the product. This feature allows for multiple categories of data related to a product to be obtained in order to conduct a comprehensive and progressive analysis of the product characteristics.

In aspects, the trained machine learning model comprises a deep learning neural network. In other aspects, the deep learning neural network comprises a classifier selected from the group consisting of: a multi-label classifier, a multiple binary classifier, a convolutional neural network classifier, a recurrent neural network classifier, and an earth mover distance classifier. Machine learning methods and deep learning methods are well suited for this type of multivariate analysis. Additionally, these classification methods may be used in a progressive analysis, as one feature (e.g., a bar code or the product packaging marking, etc.) may provide predictive value regarding related features of the product (e.g., appearance and physical properties of the product).

In aspects, the machine learning model is trained by obtaining authentic measurements and/or images of a plurality of authentic products in controlled environments, wherein the authentic measurements and/or images capture physical, chemical, spectral, and optical properties of the plurality of authentic products, and wherein the authentic measurements and/or images include one or more of external non-intrusive data, internal non-intrusive data, and internal intrusive data. The obtained authentic measurements and/or images are annotated, and the machine learning model is trained based on the annotated measurements and/or images. This feature provides for a wide variety of different types of related measurements to be considered (taken into account) in the determination of product identity. By capturing different product characteristics in different categories, a robust system is established that can identify a product based on a subset of available characteristics.

In aspects, a portion of the images are obtained from an Internet of Things (IoT) device or an Internet of Biosensors (IoB) device. This feature allows product determination to be performed in a field environment, with ease of use and ease of access to the counterfeit product detection machine learning system.

In aspects, the product is in a form of a liquid or a solid. Any suitable product in any suitable form may be identified by the techniques provided herein.

In aspects, the machine learning model comprises a deep learning model, and the deep learning model is trained with a progressive gradation of images and measurements including external non-intrusive data, internal non-intrusive data, and internal intrusive data. This approach provides for a more comprehensive and accurate analysis than contemporary approaches.

In aspects, progressive analysis comprises analyzing, by the machine learning model, product characteristics corresponding to external non-intrusive data. Based on analysis of the external non-intrusive data, features for internal non-intrusive data may be determined. Based on analysis of the internal non-intrusive data, features for internal intrusive data may be determined. In aspects, features of any of these categories may be used to predict features of other related categories. This approach provides for a comprehensive and progressive analysis to be performed to determine whether a product is real or counterfeit.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Generally, like reference numerals in the various figures are utilized to designate like components.

FIG. 2A is an illustration showing types of measurements and images that may be obtained, according to an embodiment of the present invention.

FIG. 2B is an example data preparation bitmap corresponding to measurements and images from FIG. 2A, according to an embodiment of the present invention.

FIG. 6 shows an illustration of utilizing a trained counterfeit product detection machine learning system, according to an embodiment of the present invention.

DETAILED DESCRIPTION

Current rule-based or standards-based approaches to detect real products from counterfeit products are not sufficient and often fail to detect products that visually appear to be equivalent to the real product. Additionally, rule-based or standards-based approaches are generally not scalable, not comprehensive, and not progressive. If the characteristics of the product or packaging change, rule-based models are often unable to determine real products from counterfeit products.

Techniques of present invention embodiments utilize a wide variety of measurements and images of the product to capture its physical, chemical, spectral, and optical properties. In aspects, these measurements and/or images may be obtained through the use of mobile computing devices, or other Internet of Things (IoT) or Internet of Biosensors (IoB) devices in controlled environments. These measurements and images are provided to a machine learning system that uses deep learning neural networks to determine whether the measurements and images of a product correspond to a real product or a counterfeit product. Thus, rather than providing a simple Boolean answer, the techniques of present invention embodiments provide a detection with an associated accuracy.

These techniques may be applied to any suitable substance in any suitable form, including solid (e.g., pill, powder, lyophilized substance, etc.) or liquid (e.g., suspension, emulsion, solution, etc.).

Figure 1A:
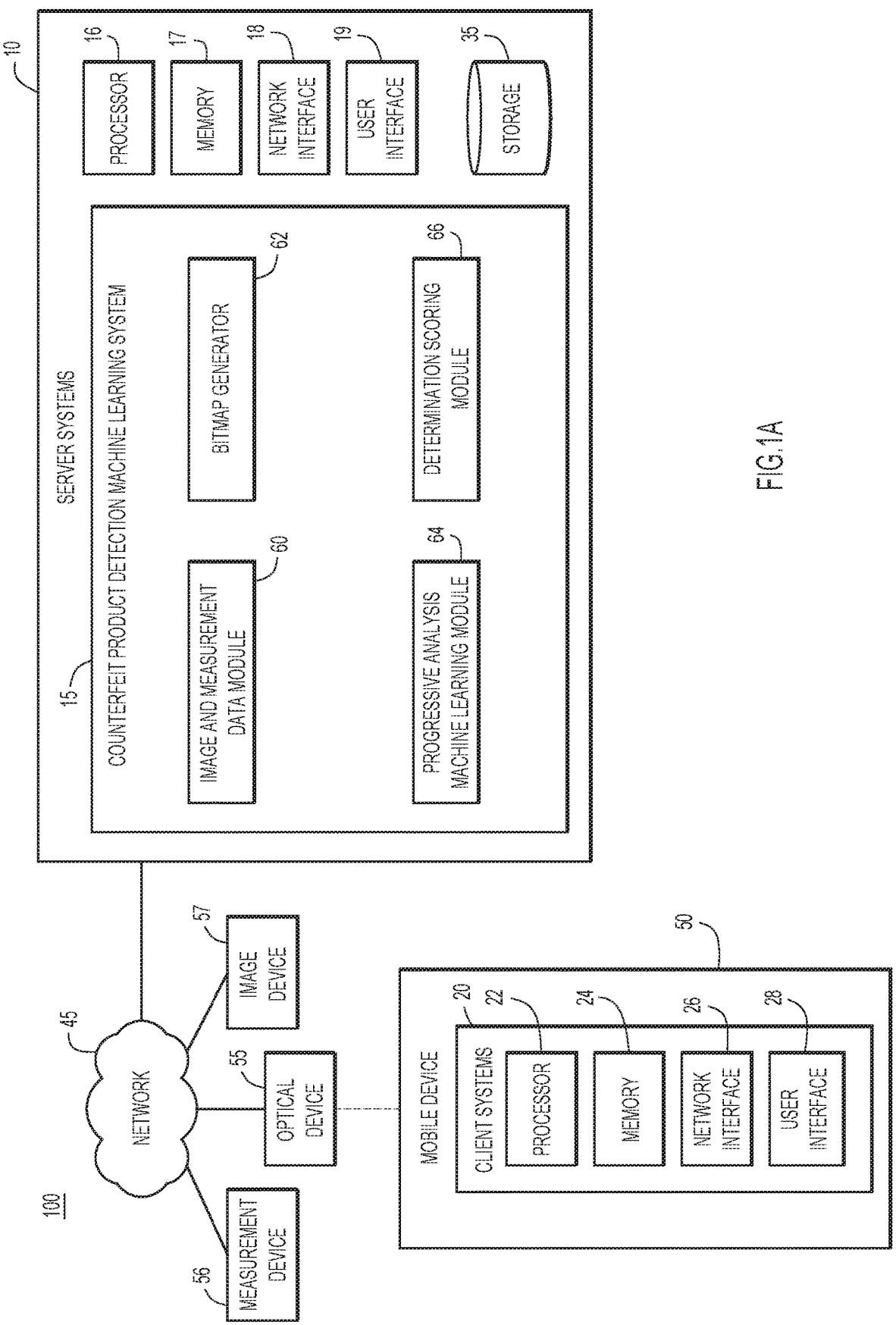
FIG. 1A is a diagrammatic illustration of an example computing environment for a counterfeit product detection machine learning system, according to an embodiment of the present invention.

An example environment for use with present invention embodiments is illustrated in FIG. 1A. Specifically, the environment includes one or more server systems 10, one or more client or end-user systems 20 (which may be part of a mobile device 50) and a network 45. Server systems 10 and client systems 20 may be remote from each other and may communicate over a network 45. The network may be implemented by any number of any suitable communications media, such as a wide area network (WAN), a local area network (LAN), Internet, Intranet, etc. Alternatively, server systems 10 and client systems 20 may be local to each other, and may communicate via any appropriate local communication medium, such as local area network (LAN), hardwire, wireless link, Intranet, etc.

Client systems 20 enable users to provide information (e.g., measurements and images) to server systems 10 and to obtain results of the analysis from server systems 10.

Server systems 10 may comprise a storage database 35 that may store various types of information (e.g., measurements and images, bitmap tables, determinations and statistics, etc.) for the analysis. Storage 35 may include any suitable information in a structured, semi-structured, or unstructured format, including images (e.g., optical photography, spectroscopy, etc.) as well as measurements (e.g., pH, viscosity, reactivity, hue, saturation, etc.).

The storage database 35 may be implemented by any conventional or other database or storage unit, may be local to or remote from server systems 10 and client systems 20 and may communicate via any appropriate communication medium, such as local area network (LAN), wide area network (WAN), Internet, hardwire, wireless link, Intranet, etc. The client systems may present a graphical user interface, such as a GUI, etc., or other interface, such as command line prompts, menu screens, etc., to solicit information from users, and to provide determinations regarding product integrity.

Server systems 10 and client systems 20 may be implemented by any conventional or other computer systems preferably equipped with a display or monitor, a base (including at least one hardware processor (e.g., microprocessor, controller, central processing unit (CPU), etc.), one or more memories and/or internal or external network interfaces or communications devices (e.g., modem, network cards, etc.), optional input devices (e.g., a keyboard, mouse or other input device), and any commercially available and custom software (e.g., server/communications software, counterfeit product detection machine learning software, browser/interface software, etc.). By way of example, the server/client includes at least one processor 16, 22 one or more memories 17, 24 and/or internal or external network interfaces or communications devices 18, 26 such as a modem or network cards, and a user interface 19, 28 etc. The optional input devices may include a keyboard, mouse, or other input device. The client system may be any suitable device, including but not limited to mobile devices, mobile devices augmented with software and(or) hardware optical devices, IoT devices, and IoB devices, tablets, etc. or any other device capable of obtaining images or measurements of the product and sending the information via a local or wide area network to counterfeit product detection machine learning system 15.

Alternatively, one or more client systems 20 may perform the operations of servers systems 10 in a stand-alone mode of operation. For example, the client system may store or have access to counterfeit product detection machine learning system 15. The graphical user or other interface 19, such as a GUI, command line prompts, menu screens, etc., solicits information from corresponding users regarding products, and may provide reports or other information including whether the product is a real product or a counterfeit product.

Counterfeit product detection machine learning system 15 may include one or more modules or units to perform the various functions of present invention embodiments described herein. The various modules (e.g., counterfeit product detection machine learning system 15, comprising image and measurement data module 60, bitmap generator 62, progressive analysis machine learning module 64, and determination scoring module 66, etc.), may be implemented by any combination of any quantity of software and/or hardware modules or units, and may reside within memory 17 of the server for execution by processor 16. These modules are described in additional detail below.

Measurement device 56 includes any device used to generate a physical measurement or other measurement of the product (e.g., a pH meter, viscometer, etc.). Image device 57 includes any suitable device (e.g., microscope, camera, etc.) for obtaining an image of the product. Optical device 55 comprises a camera capable of acquiring submicron resolution images. In some aspects, this device may clip onto a mobile device 50 such as a mobile phone, and the images may be stored in memory of the mobile device. In other aspects, the optical device may be a separate stand-alone device with a processor, memory and network interface configured to send the images to mobile device 50 and/or server systems 10.

Image and measurement data module 60 receives various types of data and extracts information to include in a bitmap. Data, which may encompass physical, chemical, spectrographic and optical information pertaining to a product, may include internal non-intrusive data, external non-intrusive data, and internal intrusive data, which is described in additional detail below. In some aspects, properties of images may be extracted (e.g., color, hue, saturation, etc.) and provided to bitmap generator for inclusion into a bitmap. In some aspects, data may be extracted automatically, in other aspects, data extraction may be user-driven. Measurements and images may represent a combination of structured and unstructured data (e.g., images of vials, images of packaging materials and containers, intrinsic measurements and images of the therapeutic substance, etc.).

Bitmap generator 62 receives information from image and measurement data module 60, and formats this data into a bitmap. In aspects, each row in a bitmap may correspond to an image, and one bitmap may be generated per product. In some aspects, a library of bitmaps may be generated corresponding to a library of real pharmaceutical and/or biologic products. Other formats are possible (e.g., a single master bitmap, a bitmap for each image, etc.), and are intended to fall within the scope of the embodiments presented herein.

Progressive analysis machine learning module 64 comprises a machine learning model that is trained using bitmap data generated by bitmap generator 62. Once trained, the machine learning module receives product information, and determines whether the product data corresponds to a real or counterfeit product.

Determination scoring module 66 provides an output to a user corresponding to the detection (e.g., real or counterfeit) as well as various metrics corresponding to the detection (e.g., accuracy, etc.). Each of these modules are described in further detail throughout the application.

Present embodiments combine artificial intelligence (AI) and machine learning (ML) with mobile technology and/or IoT devices to progressively identify fake products. In some aspects, an IoT or mobile device is configured to acquire one or more images of the product.

As described in additional detail below, a series of measurements and images capturing various properties of the real therapeutic product may be obtained, and used to train a machine learning model to distinguish a real therapeutic product from a fake therapeutic product. Once trained, the machine learning system analyses measurements and images from the corresponding product to classify the product as a real or counterfeit product.

Figure 1B:
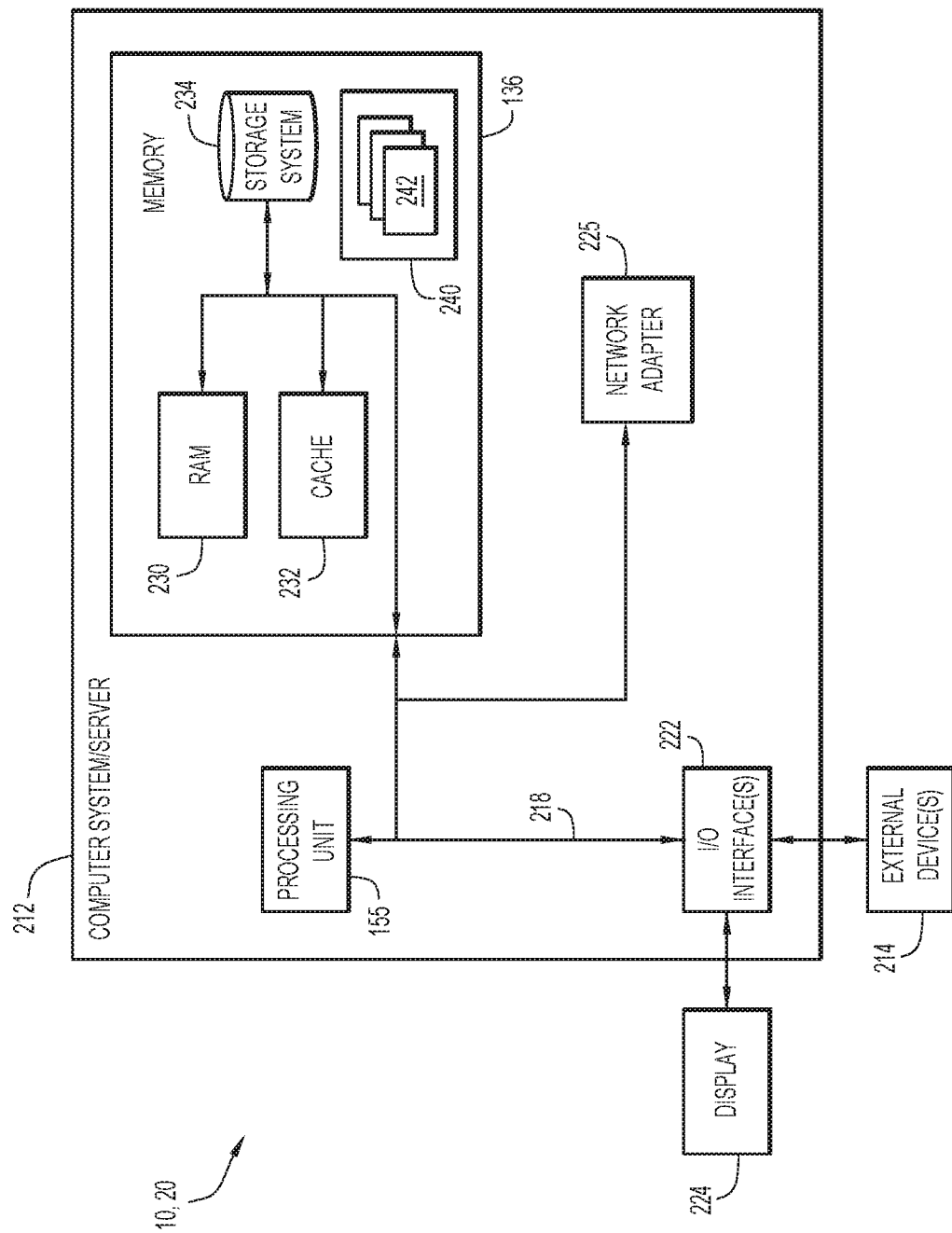
FIG. 1B is an example computing device for the computing environment of FIG. 1, according to an embodiment of the present invention.

Client systems 20 and server systems 10 may be implemented by any suitable computing device, such as computing device 212 shown in FIG. 1B for computing environment 100. This example is not intended to suggest any limitation as to the scope of use or functionality of embodiments of the invention described herein. Regardless, computing device 212 is capable of being implemented and/or performing any of the functionality set forth herein.

In the computing device, there is a computer system, which is operational with numerous other general purpose or special purpose computing system environments or configurations. Examples of well-known computing systems, environments, and/or configurations that may be suitable for use with the computer system include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 212 may be described in the general context of computer system executable instructions, such as program modules (e.g., counterfeit product detection machine learning system 15 and its corresponding modules), being executed by a computer system. Generally, program modules may include routines, programs, objects, components, logic, data structures, and so on that perform particular tasks or implement particular abstract data types.

Computer system 212 is shown in the form of a general-purpose computing device. The components of computer system 212 may include, but are not limited to, one or more processors or processing units 155, a system memory 136, and a bus 218 that couples various system components including system memory 136 to processor 155.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 212 typically includes a variety of computer system readable media. Such media may be any available media that is accessible by computer system 212, and includes both volatile and non-volatile media, removable and non-removable media.

System memory 136 can include computer system readable media in the form of volatile memory, such as random access memory (RAM) 230 and/or cache memory 232. Computer system 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 136 may include at least one program product having a set (e.g., at least one) of program modules that are configured to carry out the functions of embodiments of the invention.

Program/utility 240, having a set (at least one) of program modules 242 (e.g., counterfeit product detection machine learning system 15 and corresponding modules, etc.) may be stored in memory 136 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system 212 may also communicate with one or more external devices 214 such as a keyboard, a pointing device, a display 224, etc.; one or more devices that enable a user to interact with computer system 212; and/or any devices (e.g., network card, modem, etc.) that enable computer system 212 to communicate with one or more other computing devices. Such communication can occur via Input/Output (I/O) interfaces 222. Still yet, computer system 212 can communicate with one or more networks such as a local area network (LAN), a general wide area network (WAN), and/or a public network (e.g., the Internet) via network adapter 225. As depicted, network adapter 225 communicates with the other components of computer system 212 via bus 218. It should be understood that although not shown, other hardware and/or software components could be used in conjunction with computer system 212. Examples, include, but are not limited to: microcode, device drivers, redundant processing units, external disk drive arrays, RAID systems, tape drives, and data archival storage systems, etc.

FIGS. 2A and 2B show illustrations of the different types of data (e.g., images and measurements) that may be collected to generate training data for training a machine learning system. Various physical, chemical, spectral and optical measurements may be made to characterize a real therapeutic product. These measurements can be captured using any suitable off-the shelf device including IoT/IoB devices, optical devices, etc. as well as any other device with the capability to transmit the images and measurements over a network to the counterfeit product detector machine learning system 15.

In some aspects, a high-powered optical device may be physically attached (e.g., clipped onto) to a mobile device (e.g., a cellular phone). In this aspect, the high-powered device may be coupled to the mobile device such that the optical device allows acquisition of sub-micron images. In this case, the image may be stored in memory of the mobile device, and transmitted to counterfeit product detection machine learning system 15.

In other aspects, the device (e.g., optical device or sonography device or infrared device) may be a stand-alone device configured to obtain images, and may be configured to transmit the acquired images to the mobile device via a wireless technology such as BlueTooth® or any other suitable equivalent. In this embodiment, the image acquisition device may have its own processing unit (e.g., BlueTooth®, camera, etc.). Any suitable device for imaging the product in any modality may be used to acquire images or measurements, and this information may be transmitted over network 45 to counterfeit product detector machine learning system 15.

In some embodiments, the images may contain an identifier, specific to the product so that the data received by the counterfeit product detection machine learning system 15 may link information obtained from the different IoT devices to a single therapeutic product, thereby creating a training dataset for the therapeutic substance.

In aspects, a series of images of the therapeutic substance (e.g., pill, powder, liquid therapeutic formulation contained in a vial, freeze-dried therapeutic contained in a vial, etc.) at the submicron level may be obtained. The therapeutic substance may have any suitable form including liquid, suspension/emulsion, powder, solid, etc.

The therapeutic product may include any suitable type of therapeutic including small molecules, biologics, etc.

Measurements and images of the therapeutic product include but are not limited to any suitable physical, chemical, spectral or physical property (e.g., viscosity, pH, acidity, molecular components determined from spectroscopy, combinatorial chemicals, adhesive properties, cohesion spectrum, markings, length, height, width, shape, vial, container, size, barcode, emblem, lot number, manufacturer logo, shape of package, hologram, color, hue, saturation, value, texture, imprint on pill, reflection, fluorescence, absorption, etc.) pertaining to the therapeutic substance and/or the corresponding packaging. Many of these features are shown in FIG. 2A.

Measurements may be captured for both solid as well as liquid therapeutics, the vials containing the liquid, and the product packaging that contains the therapeutic. Example characteristics for a solid may include size, shape, texture, imprint, etc. Example characteristics for a liquid may include viscosity, hue, saturation, value, color, reflection, fluorescence, absorption, etc. Example packaging characteristics may include bar code, packaging, holographic image, lot number, manufacturer, etc.

The images may be captured at different angles and with different lighting to capture different characteristics (e.g., physical characteristics, chemical characteristics, optical characteristics, etc.) of the therapeutic product. Images may be captured by different devices to capture a wider range of optical, chemical, physical properties, etc.

Physical, chemical, spectral and optical images and measurements may fall into three categories, including external non-intrusive characteristics, internal non-intrusive characteristics, and internal intrusive characteristics.

External non-intrusive characteristics 210 (FIG. 2A) may include characteristics corresponding to the packaging containing the therapeutic product. Examples of these types of measurements may include barcode, emblem, batch and lot number, manufacturer logo, shape of packages, hologram, and numeric identifiers. For instance, different therapeutic products may have different labels, and may be made by different manufacturers.

Internal non-intrusive characteristics 220 may include characteristics corresponding to the therapeutic product that may be obtained without directly contacting the therapeutic product. For therapeutic products stored in vials, these measurements may be obtained while allowing the therapeutic products to remain undisturbed inside the vial. Examples of these types of measurements may include color, hue, saturation, values, texture, markings, reflection, fluorescence, and absorption. In some aspects, the images may be provided to image and measurement data module 60, for analysis. For example, image and measurement data module 60 may automatically analyze images (e.g., quantify properties of the images) and extract corresponding information to be provided to bitmap generator 62. In other aspects, quantification of various properties of images may be user-driven.

Internal intrusive characteristics 230 may include characteristics corresponding to the therapeutic product that may be determined by contacting the therapeutic substance. In this type of analysis, the therapeutic substance may be removed from its packaging to directly determine its properties. For example, the vial may be opened and various characteristics may be determined by contacting the product. Examples of these types of measurements may include viscosity, pH, identifying molecular components, adhesive properties, cohesion spectrum, etc.

In other aspects, chemical reagents that are capable of reacting with the therapeutic product may be mixed with the therapeutic to generate an observable outcome (e.g., a colorimetric change, formation of a precipitate, etc.). For example, a chemical may be added to the therapeutic product to react with the therapeutic product and produce a known product. In other cases, a colorimetric change may occur upon addition of the reagent. In still other cases, a physical sensor may be used to detect conductivity of the liquid in solution or other physical features. Thus, physical or chemical sensors or any other suitable sensor may be used with the embodiments provided herein.

In other aspects, any suitable imaging or spectral technology may be used to obtain images, including but not limited to radio waves, gamma waves, x-rays, ultraviolet waves, microwaves, infrared, visible light, etc. In other aspects, sound waves may be used. Any suitable measurement may be used to characterize the therapeutic product.

Once the series of images is obtained, these images may be applied to build an artificial intelligence/machine learning (AI/ML) model for that therapeutic product as described below. In some aspects, the data from the various measurements may be ordered and combined in data preparation bitmap table 205, as shown at FIG. 2B.

In aspects, for a specific therapeutic, measurements for each image may be stored in a row of a bitmap table. In this example, each type of feature may be referenced in a respective column. For example, the physical, chemical, and optical measurements, which may be external or internal, may be stored in respective columns. In some aspects, each row corresponds to a particular therapeutic product, allowing the bitmap to represent a plurality of products. In some aspects, the bits correspond to an index of measurements that have been obtained for a product, e.g., with a "1" indicating that a measurement is available for a given product and a "0" indicating that a measurement is not yet available for a given product. The bitmap may indicate available data for a machine learning model to be trained on. Other formats of bitmap tables or other data structures are contemplated for use with the present embodiments.

Once the machine learning model is deployed for identifying products in the field, additional types of product data may become available. In this case, the bitmap may be used to indicate which types of data should be used in analysis, ensuring that the types of data provided to the machine learning model is commensurate with the types of data used to train the same machine learning model.

While the following examples correspond to therapeutic substances, the embodiments presented herein are not intended to be limited to the detection of therapeutic substances. These techniques can be extended to any suitable substance (e.g., food, oil, manufacturing quality control, etc.).

Figure 3:
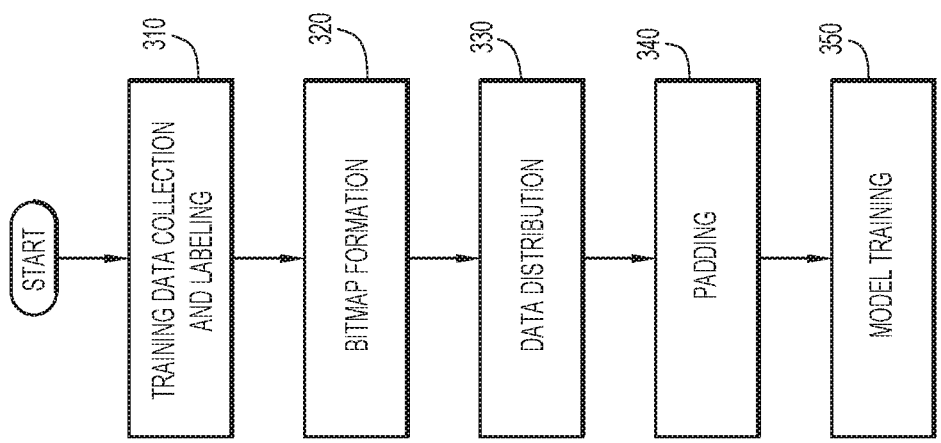
FIG. 3 shows a flowchart of operations for training a counterfeit product detection machine learning system, according to an embodiment of the present invention.

FIG. 3 shows a high-level flowchart of operations associated with the counterfeit product detection machine learning system. At operation 310, the training data is collected and features are labeled or annotated. For example, different types of measurements may be obtained (e.g., optical measurements including images of the therapeutic and/or packaging, physical measurements, chemical measurements, etc.). Data may be collected at different points in time. The collected data pertains to the real therapeutic product.

At operation 320, the collected information is formatted as a bitmap. The bitmap represents categories of measurements for data curation, and the machine learning model is trained with the data distribution from the bitmap. In aspects, images are not stored in the bitmap. Rather, the bitmap contains the features/measurements extracted from the images. Bits may be arranged in any logical group (e.g., hue/optical/non-intrusive/non-intrusive-optical etc.) in any suitable order to allow progressive analysis based on external to internal properties (e.g., external non-intrusive to internal non-intrusive to internal intrusive properties).

In some aspects, a row of the bitmap may represent an image of a particular therapeutic product, and another row may correspond to another image of the same product. A row of the bitmap may also contain physical or other properties of the therapeutic. To represent a plurality of therapeutics, a plurality of bitmaps may be configured, one bitmap pertaining to one therapeutic. Other formats are possible, and the bitmaps provided in FIG. 2B are by way of example only.

Accordingly, the bitmap indicates which types of data are available, and during training, all available combinations of data are utilized, allowing the detection to be performed progressively.

At operation 330, data distribution is evaluated. In some aspects, the data for the products may be collected at different points in time or with different granularity. In other aspects, packaging or other external characteristics may change as a function of time. Thus, multiple entries in a bitmap table may be generated for a therapeutic product (e.g., a first row directed towards an older packaging, and a second row may be directed towards a newer packaging for the same product). Alternatively, newer data may replace older data as available.

At operation 340, the bitmap is padded to account for data that is not available. For example, the bitmap may be padded with values such as "0" for data that is not yet available. In other aspects, measured values corresponding to properties of the product may be stored separately in one or more tables, lists, images, etc. with the bitmap effectively acting as an index regarding the available data. The bitmap may be updated when an average or normalized value becomes available. Thus, bitmaps may contain binary values.

Once data has been collected, analyzed, and formatted in bitmap tables, the corresponding training data may be used to train an AI/ML model at operation 350. Any suitable AWL model may be used. In some aspects, neural networks may be used. In some aspects, deep learning may be used.

Figure 4:
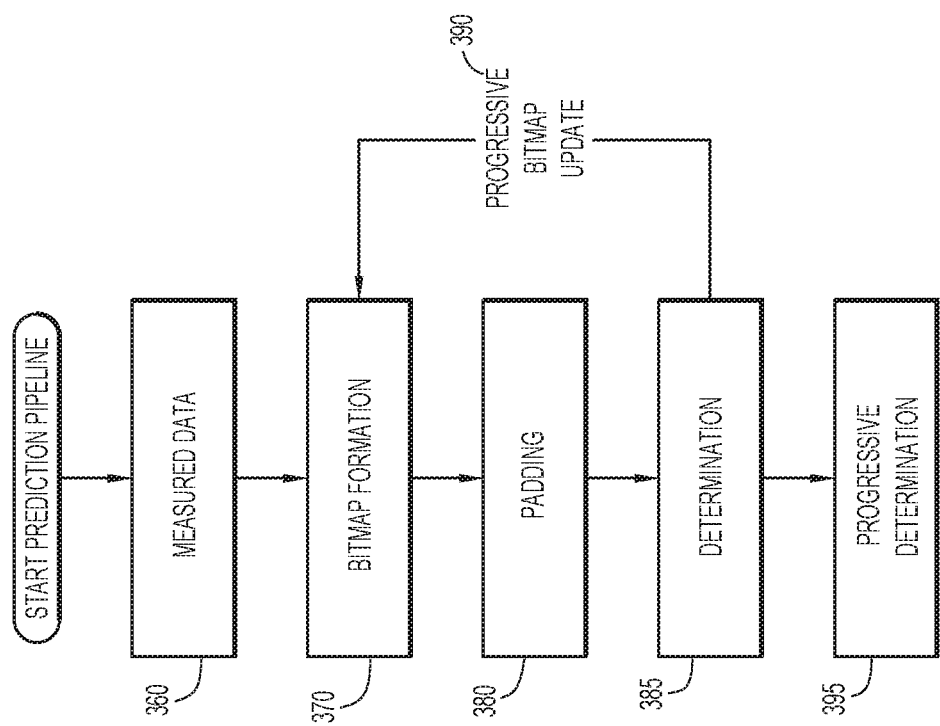
FIG. 4 shows a flowchart of operations for utilizing a trained counterfeit product detection machine learning system, according to an embodiment of the present invention.

FIG. 4 is an example flowchart showing operations of the trained AI/ML model. At operation 360, measured data pertaining to the product is collected. The measured data may include any of the aforementioned types of data including external non-intrusive, internal non-intrusive, and internal intrusive data. In some aspects, features may be automatically extracted from the images. For example, for images, hue, color, and other characteristics may be determined by the processor that analyzes the image. For markings, machine learning models trained to recognize markings or bar codes may be employed. In other aspects, features may be provided manually to the ML model, e.g., via a user interface.

Data may be obtained at different points in time. For instance, in some aspects, data may only be available for the packaging of the therapeutic product. In other aspects, the therapeutic product may be contained in a vial (e.g., clear, amber, etc.), and information may be obtained for the vial (here, data is not inclusive of the therapeutic inside the vial).

At operation 370, measurements are formatted as bitmap data. In aspects, the product bitmap data may comprise a subset of training bitmap data used to train the machine learning system. In aspects, for sparse data, the system may make a determination as to whether the system can generate a detection or classification within an acceptable confidence interval.

At operation 380, the bitmap is padded, in instances in which candidate data is not available for a specific column (pertaining to a specific row of data corresponding to a product). At operation 390, the AI/ML system analyzes the bitmap data (and corresponding values) to make a detection as to whether the information matches a real therapeutic product within a defined confidence interval.

In aspects, the ML model is trained with a comprehensive set of data spanning external non-intrusive data, internal non-intrusive data, and internal intrusive data. The measurements and/or images, may represent a subset of the types of data that the machine learning system has been trained on. Since training of the ML system is performed on a superset of data, determination may be performed using a subset of data, and trend towards a superset as additional product data becomes available.

At operation 390, the bitmap may be updated as new features are identified over time. At operation 395, a progressive detection or classification is made along with corresponding statistical criteria (e.g., accuracy).

With respect to FIGS. 3 and 4, any suitable machine learning model may be used, including models comprising algorithms for neural networks and deep learning neural networks. Deep learning classifiers include but are not limited to a multi-label classifier, a multiple binary classifier, a convolutional neural network classifier, a recurrent neural network classifier, and an earth mover distance classifier. Deep learning neural networks may be used to accurately identify digital representations of images comprising different features.

Deep learning algorithms learn data progressively as analysis progresses through each neural network layer. In some aspects, early layers may detect low-level features, and subsequent layers may combine features from earlier layers to generate a holistic representation of the product. In some aspects, the deep learning neural network may undergo training in an iterative manner, using stochastic gradient optimization to arrive a suitably trained machine learning model.

In other aspects, multi-label models may be used. For example, layers of multi-label models may be implemented (e.g., a machine learning model for external non-intrusive data, another model for internal non-intrusive data, and another model for internal intrusive data). In other aspects, a single layer may be implemented.

In an example implementation, a multi-label classification may be used, wherein the training set is composed of features. The machine learning model may determine the feature sets of unseen instances through analyzing training data with known feature sets. For example, for a given set of extrinsic non-invasive measurements, the machine learning system may determine feature sets of intrinsic non-invasive measurements and/or intrinsic invasive measurements. If determined feature sets are not verified, the machine learning model may flag the product as counterfeit, due to a mismatch between determined and identified features (e.g., a mismatch between product packaging and product internal characteristics).

Figure 5:
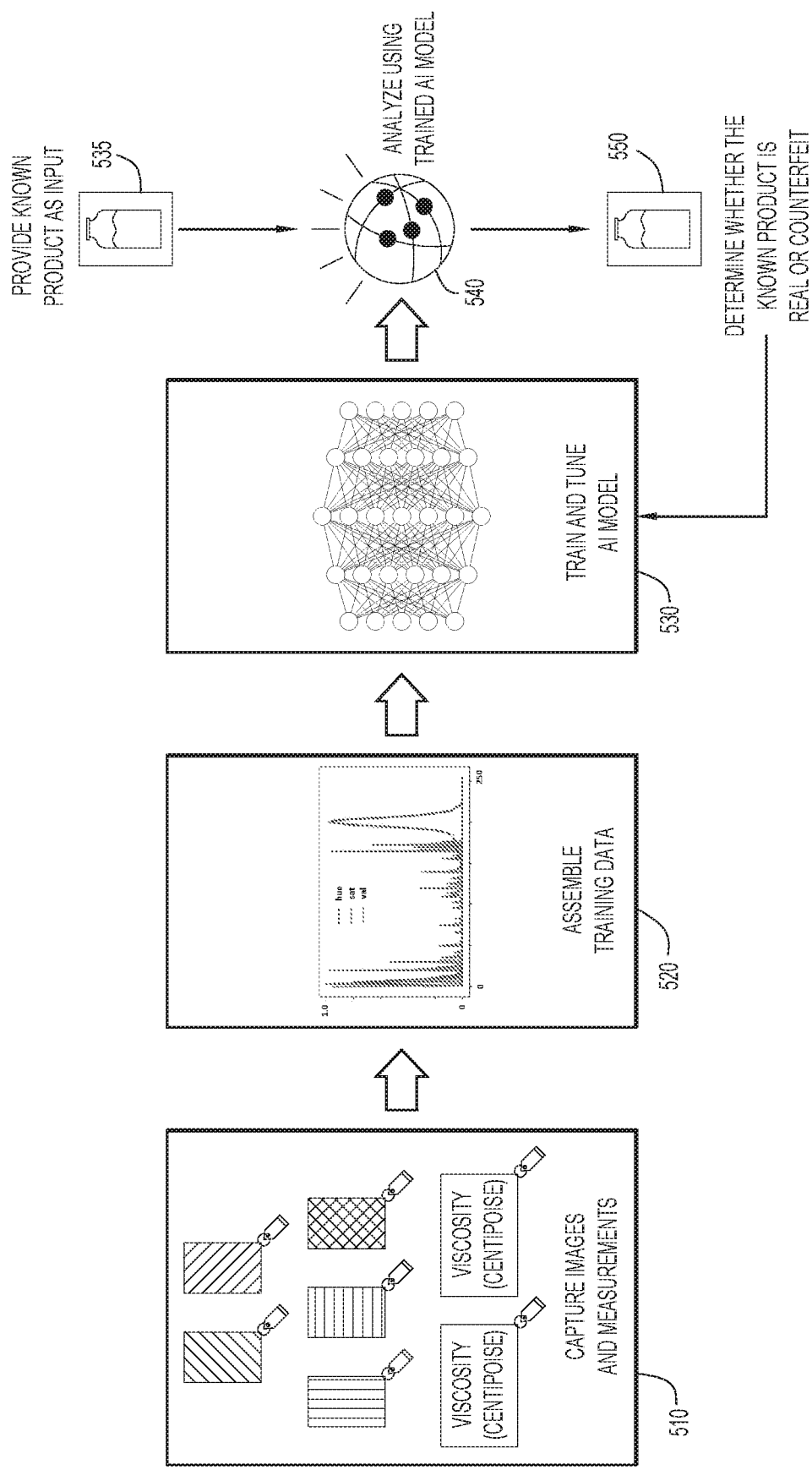
FIG. 5 shows an illustration of training a counterfeit product detection machine learning system, according to an embodiment of the present invention.

FIG. 5 shows an example implementation of training a counterfeit product detection machine learning system, corresponding to the operations in FIG. 3. At operation 510, images and measurements are obtained pertaining to the real therapeutic product. This may include characteristics from external non-intrusive, internal non-intrusive and internal intrusive measurements. At operation 520, the captured images and measurements are annotated as needed and assembled to generate training data (e.g., in the form of a bitmap). At operation 530, the training data is used to train and tune the AWL model. Once the model is trained on available data, measurements and images pertaining to a known product may be provided to the trained model at operation 535. The trained model makes a determination as to whether the known product is real or counterfeit. In aspects, examples of known products may include real products or counterfeit products with mismatches between external non-intrusive, internal non-intrusive and internal intrusive measurements. At operation 540, the system analyzes the bitmap data, and makes a detection at operation 550 regarding whether the known product is real or counterfeit. If the model makes an incorrect detection, the model parameters may be tuned until the results fall within a desired range of accuracy. Thus, in aspects, the trained model outputs a detection or classification as to whether the known product is real or counterfeit, along with an accuracy of the detection or classification.

Figure 6:
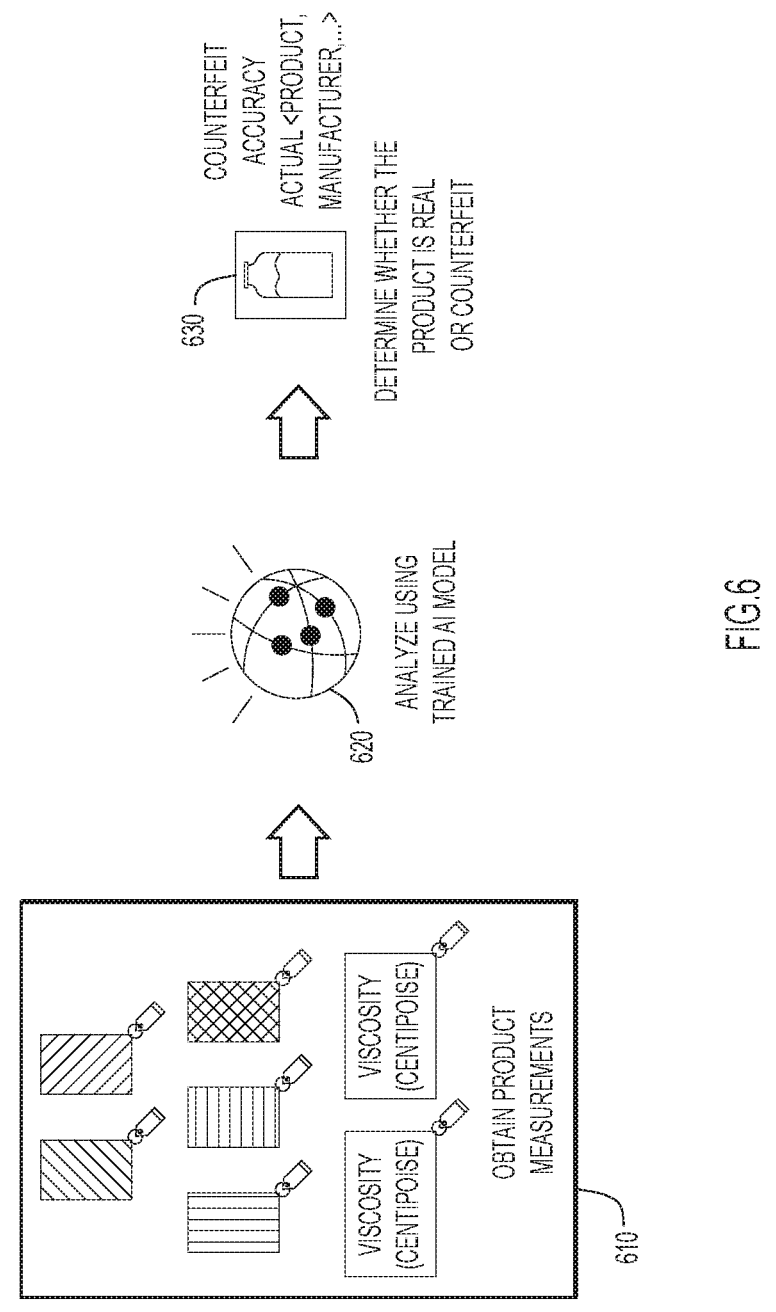

FIG. 6 shows an example flowchart of the system in operation. At operation 610, images and measurements are obtained for a product. The images and data are formatted as bitmap data and provided to the trained AI/ML model for analysis at operation 620. The model analyzes the received information, and outputs a detection or classification at operation 630 as to whether the product is a real therapeutic or a counterfeit therapeutic.

Thus, present techniques progressively detect fake therapeutic products. For example, upon receipt of a product, the system may first analyze the packaging to determine whether the packaging is real or counterfeit. The product may be removed from its external packaging, and the container (if applicable) encapsulating the product may be analyzed for authenticity. Finally, the therapeutic product may be analyzed directly to determine whether it is authentic or counterfeit. Thus, these techniques provide multiple levels of progressive analysis to determine a product's authenticity. For detection pipelines, data may be padded to lead to a progressive detection.

Figure 7:
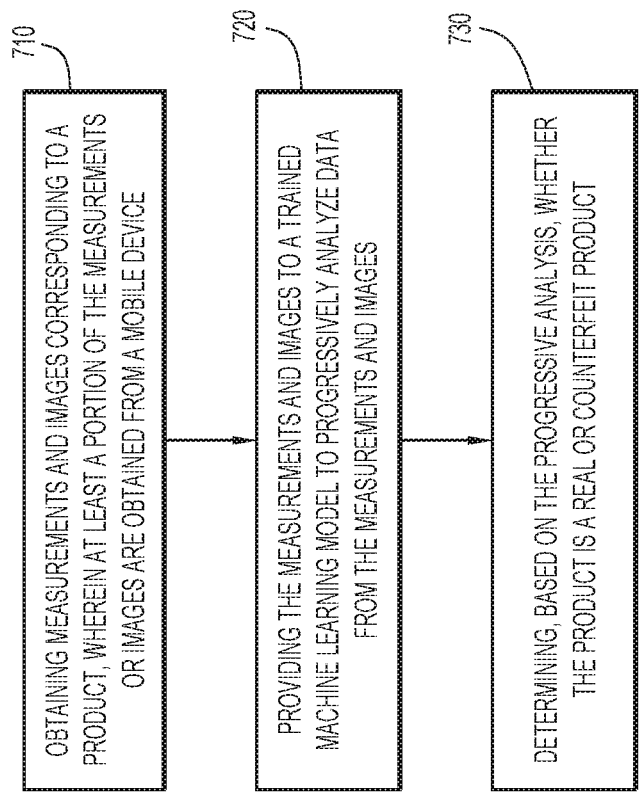
FIG. 7 shows a high-level flowchart for detecting whether a product is real or counterfeit using a trained counterfeit product detection machine learning system, according to an embodiment of the present invention.

FIG. 7 is an operational flow chart showing high level operations of the techniques provided herein. At operation 710, measurements and images corresponding to a product are obtained, wherein at least a portion of the measurements or images are obtained from a mobile device. At operation 720, the measurements and images are provided to a trained machine learning model to progressively analyze data from the measurements and images. At operation 730, based on the progressive analysis, the system detects whether the product is a real or counterfeit product.

Techniques of present invention embodiments utilize a progressive data approach to train a AI/ML model to detect counterfeit products. Detections may occur in a progressive mode to uncover the spectrum of points where a counterfeit product may have been introduced.

Present techniques encapsulate the physical, chemical, optical, and spectral properties into a deep learning neural network model to detect whether a product is real or counterfeit through progressive training and detection. This approach may identify real from counterfeit products in a spectrum of simple to sophisticated models of counterfeit products, which is an improvement over rule-based models.

Mobile devices and IoT devices blend physical and digital realms, allowing the capture of various types of data (e.g., images and measurements) pertaining to therapeutic products in order to detect counterfeit therapeutic products. In contrast to rule-based approaches, which cannot adapt with evolution of products during a product lifetime and is not scalable, present techniques are progressive and scalable, and may be applied over the lifetime of the product.

Techniques of present invention embodiments may be applied to a wide variety of environments, including the pharmaceutical industry, food industry, petroleum industry, manufacturing quality control, etc.

It will be appreciated that the embodiments described above and illustrated in the drawings represent only a few of the many ways of implementing embodiments for detecting counterfeit products.

The environment of the present invention embodiments may include any number of computer or other processing systems (e.g., client or end-user systems, server systems, etc.) and databases or other repositories arranged in any desired fashion, wherein the present invention embodiments may be applied to any desired type of computing environment (e.g., cloud computing, client-server, network computing, mainframe, stand-alone systems, etc.). The computer or other processing system employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, counterfeit product detection machine learning system 15, etc.). These systems may include any type of monitors and input devices (e.g., keyboard, mouse, voice recognition, etc.) to enter and/or view information.

It is to be understood that the software (e.g., counterfeit product detection machine learning system 15, including image and measurement data module 60, bitmap generator 62, progressive analysis machine learning module 64, and determination scoring module 66, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., counterfeit product detection machine learning system 15, image and measurement data module 60, bitmap generator 62, progressive analysis machine learning module 64, and determination scoring module 66, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., bitmaps, images, measurements, scores, etc.). The database system may be implemented by any number of any conventional or other databases, data stores or storage structures (e.g., files, databases, data structures, data or other repositories, etc.) to store information (e.g., bitmaps, images, measurements, scores, etc.). The database system may be included within or coupled to the server and/or client systems. The database systems and/or storage structures may be remote from or local to the computer or other processing systems, and may store any desired data (e.g., bitmaps, images, measurements, scores, etc.).

The present invention embodiments may employ any number of any type of user interface (e.g., Graphical User Interface (GUI), command-line, prompt, etc.) for obtaining or providing information (e.g., bitmaps, images, measurements, scores, etc.), wherein the interface may include any information arranged in any fashion. The interface may include any number of any types of input or actuation mechanisms (e.g., buttons, icons, fields, boxes, links, etc.) disposed at any location to enter/display information and initiate desired actions via any suitable input devices (e.g., mouse, keyboard, etc.). The interface screens may include any suitable actuators (e.g., links, tabs, etc.) to navigate between the screens in any fashion.

The output of the counterfeit product detection machine learning system 15 may include any information arranged in any fashion, and may be configurable based on rules or other criteria to provide desired information to a user (e.g., determination, statistics such as accuracy, etc.).

The present invention embodiments are not limited to the specific tasks or algorithms described above, but may be utilized for any application in which identifying real or counterfeit products may be desirable in a general population. Further, this approach may be generally applicable to providing support in any context, and is not limited to any particular application domain, such as clinical, biomedical, research-oriented, manufacturing, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method to identify counterfeit therapeutic products or chemicals comprising:
    obtaining measurements and images corresponding to a product, wherein at least a portion of the measurements or images are obtained from a mobile device, and wherein the measurements and images include external non-intrusive data including characteristics corresponding to packaging of the product, internal non-intrusive data including characteristics of the product determined without directly contacting the product, and internal intrusive data including characteristics of the product determined by contacting the product;
    providing the measurements and images to a trained machine learning model to progressively analyze data from the measurements and images in an order of the external non-intrusive data, the internal non-intrusive data, and the internal intrusive data, wherein the progressive analysis comprises:
        analyzing, by the machine learning model, the characteristics corresponding to the external non-intrusive data to determine authenticity of the packaging of the product; and
        analyzing, by the machine learning model, the characteristics corresponding to the internal non-intrusive data and the internal intrusive data to determine authenticity of the product; and
    detecting, based on the progressive analysis, whether the product is a real or counterfeit product.

2. The method of claim 1, wherein the measurements and images capture physical, spectral, optical, and/or chemical properties of the product.

3. The method of claim 1, wherein the trained machine learning model comprises a deep learning neural network.

4. The method of claim 3, wherein the deep learning neural network comprises a classifier selected from a group consisting of: a multi-label classifier, a multiple binary classifier, a convolutional neural network classifier, a recurrent neural network classifier, and an earth mover distance classifier.

5. The method of claim 1, wherein the trained machine learning model is trained by:
    obtaining authentic measurements and/or images of a plurality of authentic products, wherein the authentic measurements and/or images capture physical, chemical, spectral, and optical properties of the plurality of authentic products, and wherein the authentic measurements and/or images include one or more of external non-intrusive data, internal non-intrusive data, and internal intrusive data;
    annotating the obtained authentic measurements and/or images; and
    training the machine learning model based on the annotated measurements and/or images.

6. The method of claim 1, wherein a portion of the images are obtained from an Internet of Things (IoT) device or an Internet of Biosensors (IoB) device.

7. The method of claim 1, wherein the product is in a form of a liquid or a solid.

8. The method of claim 1, wherein the machine learning model comprises a deep learning model, and wherein the deep learning model is trained with a progressive gradation of images and measurements including external non-intrusive data, internal non-intrusive data, and internal intrusive data.

9. The method of claim 1, wherein the progressive analysis comprises:
    based on the analysis of the external non-intrusive data, determining features for the internal non-intrusive data; and
    based on the analysis of the internal non-intrusive data, determining features for the internal intrusive data.

10. A system to identify counterfeit therapeutic products or chemicals, the system comprising:
    one or more computer processors;
    one or more computer readable storage media;
    program instructions stored on the one or more computer readable storage media for execution by at least one of the one or more computer processors, the program instructions comprising instructions to:
        obtain measurements and images corresponding to a product, wherein at least a portion of the measurements or images are obtained from a mobile device, and wherein the measurements and images include external non-intrusive data including characteristics corresponding to packaging of the product, internal non-intrusive data including characteristics of the product determined without directly contacting the product, and internal intrusive data including characteristics of the product determined by contacting the product;

provide the measurements and images to a trained machine learning model to progressively analyze data from the measurements and images in an order of the external non-intrusive data, the internal non-intrusive data, and the internal intrusive data, wherein the progressive analysis comprises:

analyzing, by the machine learning model, the characteristics corresponding to the external non-intrusive data to determine authenticity of the packaging of the product; and analyzing, by the machine learning model, the characteristics corresponding to the internal non-intrusive data and the internal intrusive data to determine authenticity of the product; and detect, based on the progressive analysis, whether the product is a real or counterfeit product.

11. The system of claim 10, wherein the measurements and images capture physical, spectral, optical, and/or chemical properties of the product.

12. The system of claim 10, wherein the trained machine learning model comprises a deep learning neural network.

13. The system of claim 12, wherein the deep learning neural network comprises a classifier selected from a group consisting of: a multi-label classifier, a multiple binary classifier, a convolutional neural network classifier, a recurrent neural network classifier, and an earth mover distance classifier.

14. The system of claim 10, wherein the program instructions further comprise instructions to:

obtain authentic measurements and/or images of a plurality of authentic products, wherein the authentic measurements and/or images capture physical, chemical, spectral, and optical properties of the plurality of authentic products, and wherein the authentic measurements and/or images include one or more of external non-intrusive data, internal non-intrusive data, and internal intrusive data;

annotate the obtained authentic measurements and/or images; and train the machine learning model based on the annotated measurements and/or images.

15. The system of claim 10, wherein a portion of the images are obtained from an Internet of Things (IoT) device or an Internet of Biosensors (IoB) device.

16. The system of claim 10, wherein the product is in a form of a liquid or a solid.

17. The system of claim 10, wherein the machine learning model comprises a deep learning model, and wherein the deep learning model is trained with a progressive gradation of images and measurements including external non-intrusive data, internal non-intrusive data, and internal intrusive data.

18. The system of claim 10, wherein the program instructions further comprise instructions to:

based on the analysis of the external non-intrusive data, determine features for the internal non-intrusive data; and based on the analysis of the internal non-intrusive data, determine features for the internal intrusive data.

19. A computer program product to identify counterfeit therapeutic products or chemicals, the computer program product comprising one or more computer readable storage media collectively having program instructions embodied therewith, the program instructions executable by a computer to cause the computer to:

obtain measurements and images corresponding to a product, wherein at least a portion of the measurements or images are obtained from the mobile device, and wherein the measurements and images include external non-intrusive data including characteristics corresponding to packaging of the product, internal non-intrusive data including characteristics of the product determined without directly contacting the product, and internal intrusive data including characteristics of the product determined by contacting the product;

provide the measurements and images to a trained machine learning model to progressively analyze data from the measurements and images in an order of the external non-intrusive data, the internal non-intrusive data, and the internal intrusive data, wherein the progressive analysis comprises:

analyzing, by the machine learning model, the characteristics corresponding to the external non-intrusive data to determine authenticity of the packaging of the product; and analyzing, by the machine learning model, the characteristics corresponding to the internal non-intrusive data and the internal intrusive data to determine authenticity of the product; and detect, based on the progressive analysis, whether the product is a real or counterfeit product.

20. The computer program product of claim 19, wherein the program instructions further comprise instructions to:

based on the analysis of the external non-intrusive data, determine features for the internal non-intrusive data; and based on the analysis of the internal non-intrusive data, determine features for the internal intrusive data.

* * * * *